United States Patent
Sonnathi et al.

(10) Patent No.: US 12,143,028 B2
(45) Date of Patent: Nov. 12, 2024

(54) ELECTRICAL ASSEMBLY

(71) Applicant: General Electric Technology GmbH, Baden (CH)

(72) Inventors: Chandra Mohan Sonnathi, Stafford (GB); Rajaseker Reddy Ginnareddy, Stafford (GB); Carl Barker, Stafford (GB)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 275 days.

(21) Appl. No.: 17/794,053

(22) PCT Filed: Jan. 26, 2021

(86) PCT No.: PCT/EP2021/051681
§ 371 (c)(1),
(2) Date: Jul. 20, 2022

(87) PCT Pub. No.: WO2021/156096
PCT Pub. Date: Aug. 12, 2021

(65) Prior Publication Data
US 2023/0054979 A1    Feb. 23, 2023

(30) Foreign Application Priority Data

Feb. 7, 2020 (EP) .................................. 20275027

(51) Int. Cl.
*H02M 7/217* (2006.01)
*H02M 1/08* (2006.01)
(Continued)

(52) U.S. Cl.
CPC ............. *H02M 7/217* (2013.01); *H02M 1/08* (2013.01); *H02M 1/32* (2013.01); *H02M 7/7575* (2013.01)

(58) Field of Classification Search
CPC .......... H02M 7/217; H02M 1/08; H02M 1/32; H02M 7/7575
See application file for complete search history.

(56) References Cited

U.S. PATENT DOCUMENTS

| 8,779,730 B2 | 7/2014 | Jiang-Häfner et al. | |
| 11,777,401 B2 * | 10/2023 | Sonnathi | H02M 1/32 363/56.01 |
| 2023/0344257 A1 * | 10/2023 | Davidson | H02J 7/00309 |

FOREIGN PATENT DOCUMENTS

| WO | 2017080597 A1 | 5/2017 |
| WO | 2019179787 A1 | 9/2019 |

* cited by examiner

*Primary Examiner* — Kyle J Moody
(74) *Attorney, Agent, or Firm* — Eversheds-Sutherland (US) LLP

(57) ABSTRACT

Embodiments of the disclosure include an electrical assembly. The electrical assembly can include a converter including a DC side and an AC side, the DC side configured for connection to a DC network, the AC side configured for connection to an AC network, the converter including at least one switching element; a circuit interruption device operably connected to the AC side of the converter; a DC voltage modification device operably connected to the DC side of the converter, the DC voltage modification device including a DC chopper; and a controller configured to selectively control the or each switching element, the circuit interruption device and the DC voltage modification device, wherein the controller is configured to be responsive to a converter internal fault by carrying out a fault operating mode.

14 Claims, 5 Drawing Sheets

(51) Int. Cl.
*H02M 1/32* (2007.01)
*H02M 7/757* (2006.01)

ELECTRICAL ASSEMBLY

CROSS-REFERENCE TO RELATED APPLICATIONS

This application is a U.S. National Stage Application under 35 U.S.C. 371 and claims the priority benefit of International Application No. PCT/EP2021/051681, filed Jan. 26, 2021, which claims priority to European Application No. 20275027.9, filed Feb. 7, 2020, both of which are incorporated herein by reference.

This invention relates to an electrical assembly comprising a converter for transferring power between DC and AC networks, preferably for use in high voltage direct current (HVDC) transmission.

In HVDC power transmission networks alternating current (AC) power is typically converted to direct current (DC) power for transmission via overhead lines, under-sea cables and/or underground cables. This conversion removes the need to compensate for the AC capacitive or inductive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilised in power transmission networks where it is necessary to interconnect the DC and AC networks. In any such power transmission network, converters are required at each interface between AC and DC power to effect the required conversion from AC to DC or from DC to AC.

According to a first aspect of the invention, there is provided an electrical assembly comprising:

- a converter including a DC side and an AC side, the DC side configured for connection to a DC network, the AC side configured for connection to an AC network, the converter including at least one switching element;
- a circuit interruption device operably connected to the AC side of the converter;
- a DC voltage modification device operably connected to the DC side of the converter, the DC voltage modification device including a DC chopper; and
- a controller configured to selectively control the or each switching element, the circuit interruption device and the DC voltage modification device,
- wherein the controller is configured to be responsive to a converter internal fault by carrying out a fault operating mode in which the controller controls: the or each switching element to block the converter; the circuit interruption device to electrically isolate the converter from the AC network; and the DC voltage modification device to reduce or minimise a DC voltage presented by the DC network to the DC side of the converter.

An occurrence of a converter internal fault may result in the flow of a fault current through the converter that results in the converter experiencing an over voltage. The magnitude of the over voltage depends on various electrical parameters of the converter and the associated DC and AC networks, such as DC voltage level at the DC side of the converter during the converter internal fault (which typically depends on the circuit arrangement and DC transmission system parameters), the type of DC grounding of the converter (e.g. solid grounding or high impedance grounding), the short circuit MVA of the AC network, impedance levels of any associated transformer and reactors and the AC voltage level at the AC side of the converter (e.g. the AC voltage level of the transformer winding connected to the AC side of the converter).

The configuration of the controller of the electrical assembly according to the invention provides a way of reducing the magnitude of the over voltage experienced by the converter during the converter internal fault. The flow of the fault current through the converter during the converter internal fault is primarily driven by the DC voltage at the DC side of the converter and the AC voltage at the AC side of the converter and opposed by any DC voltage internal to the converter generated by one or more converter components, such as an energy storage device of a chain-link module. Hence, the capability of the controller to carry out the fault operating mode responsive to the converter internal fault provides control over the DC voltage at the DC side of the converter in order to collapse the DC voltage and thereby minimise the flow of the fault current through the converter, thus reducing the over voltage experienced by the converter. This in turn avoids the risk of one or more converter components experiencing an over voltage during the fault. Meanwhile the blocking of the converter and the electrical isolation of the converter from the AC network completes the fault response in order to protect the converter from the fault current arising from the converter internal fault. The level of reduction or minimisation of the DC voltage at the DC side of the converter depends on the configuration and control of the DC voltage modification device.

The invention provides a simple and cost-effective fault response solution that can be designed to use a low number of power electronic components. This in turn provides reduced converter costs, reduced converter losses and other associated benefits, such as improved reliability, available and maintainability (RAM) figures.

In a preferred embodiment of the invention, the controller is configured to simultaneously initiate the control of: the or each switching element to block the converter; the circuit interruption device to electrically isolate the converter from the AC network; and the DC voltage modification device to reduce or minimise a DC voltage presented by the DC network to the DC side of the converter. This enables the electrical assembly to provide an enhanced fault response to the converter internal fault.

In embodiments of the invention, the converter may include a plurality of phases, each phase may include at least one switching element, and the controller may be configured to be responsive to the converter internal fault occurring in one of the phases by carrying out the fault operating mode. In such embodiments, the converter internal fault may be a phase to ground fault.

By carrying out the fault operating mode in response to the converter internal fault, the invention limits the exposure of the or each healthy phase of the converter to the over voltage arising from the flow of the fault current.

In further embodiments of the invention, the converter may include at least one module arranged to interconnect the DC and AC sides, the or each module including at least one module switching element and at least one energy storage device, the or each module switching element and the or each energy storage device in the or each module arranged to be combinable to selectively provide a voltage source, the or each module switchable to control a transfer of power between the DC and AC networks.

During the converter internal fault, the fault current may flow in the converter so as to charge one or more energy storage devices so that the converter experiences a fault voltage which is higher than its normal operating voltage. In order to keep the fault voltage within the voltage rating of the energy storage device(s), it is necessary for the energy storage device(s) to have a sufficient energy storage capacity to accommodate the charging operation arising from the flow of the fault current in the converter.

By carrying out the fault operating mode in response to the converter internal fault, the rate of charging of the energy storage device(s) is slower, which limits the voltage of the or each energy storage device in the fault mode and avoids the energy storage device(s) experiencing an over voltage and thereby effectively reduces the required amount of energy storage capacity to accommodate the charging operation arising from the flow of the fault current in the converter. The configuration of the controller to carry out the fault operating mode responsive to the converter internal fault therefore enables the optimisation of the energy storage capacity of the energy storage device(s), and therefore enables the optimisation of the number of modules in the converter to provide reductions in terms of converter size and footprint as well as cost savings, lower losses, and smaller cooling hardware requirements, without compromising on the ability of the converter to operate efficiently and reliably in its normal and fault operating states.

The configuration of the converter may vary depending on its operating requirements.

In still further embodiments of the invention, the converter may include a plurality of converter limbs, each converter limb extending between first and second DC terminals, each converter limb including first and second limb portions separated by an AC terminal, each limb portion including at least one switching element, and the controller may be configured to be responsive to the converter internal fault occurring in or associated with one or some of the plurality of converter limbs by carrying out the fault operating mode.

In a preferred embodiment of the invention, the converter includes three converter limbs, each of which is connectable via the respective AC terminal to a respective phase of a three-phase AC network. It will be appreciated that the converter may include a different number of converter limbs, each of which is connectable via the respective AC terminal to a respective phase of an AC network with the corresponding number of phases.

The electrical assembly may include a sensor for detecting the converter internal fault, the sensor configured to be in communication with the controller. The sensor may be in the form of: a current sensor to detect the flow of the fault current by measuring an over current or the rate of change of current with time; or a voltage sensor configured to detect the presence of an under voltage.

Optionally the DC voltage modification device may include a dynamic braking resistor. The provision of the dynamic braking resistor in the DC voltage modification device enhances the reduction or minimisation of the DC voltage in the fault operating mode through energy dissipation.

According to a second aspect of the invention, there is provided a method of operating an electrical assembly, the electrical assembly comprising:
a converter that includes a DC side and an AC side, the DC side configured for connection to a DC network, the AC side configured for connection to an AC network, the converter including at least one switching element;
a circuit interruption device operably connected to the AC side of the converter; and
a DC voltage modification device operably connected to the DC side of the converter, the DC voltage modification device including a DC chopper,
wherein the method comprises the step of carrying out a fault operating mode responsive to a converter internal fault by:
controlling the or each switching element to block the converter;
controlling the circuit interruption device to electrically isolate the converter from the AC network; and
controlling the DC voltage modification device to reduce or minimise a DC voltage presented by the DC network to the DC side of the converter.

The features and advantages of the electrical assembly of the first aspect of the invention and its embodiments apply mutatis mutandis to the method of the second aspect of the invention and its embodiments.

In the method of the invention, the converter may include a plurality of phases, and each phase may include at least one switching element, wherein the method may include the step of carrying out the fault operating mode responsive to the converter internal fault occurring in one of the phases.

In the method of the invention, the converter internal fault may be a phase to ground fault.

In the method of the invention, the converter may include at least one module arranged to interconnect the DC and AC sides, the or each module including at least one module switching element and at least one energy storage device, the or each module switching element and the or each energy storage device in the or each module arranged to be combinable to selectively provide a voltage source, the or each module switchable to control a transfer of power between the DC and AC networks.

In the method of the invention, the converter may include a plurality of converter limbs, each converter limb extending between first and second DC terminals, each converter limb including first and second limb portions separated by an AC terminal, each limb portion including at least one switching element, wherein the method may include the step of carrying out the fault operating mode responsive to the converter internal fault occurring in or associated with one or some of the plurality of converter limbs.

The method of the invention may include the step of detecting the converter internal fault. In the method of the invention, the DC voltage modification device may include a dynamic braking resistor.

The or each module may vary in configuration so long as the or each module is capable of performing a switching function to control a transfer of power between the DC and AC networks. Non-limiting examples of the configuration of the or each module are set out as follows.

In a first exemplary configuration of a module, the or each module switching element and the or each energy storage device in the module may be arranged to be combinable to selectively provide a unidirectional voltage source. For example, the module may include a pair of module switching elements connected in parallel with an energy storage device in a half-bridge arrangement to define a 2-quadrant unipolar module that can provide zero or positive voltage and can conduct current in two directions.

In a second exemplary configuration of a module, the or each module switching element and the or each energy storage device in the module may be arranged to be combinable to selectively provide a bidirectional voltage source. For example, the module may include two pairs of module switching elements connected in parallel with an energy storage device in a full-bridge arrangement to define a 4-quadrant bipolar module that can provide negative, zero or positive voltage and can conduct current in two directions.

A plurality of modules may be connected in series to define a chain-link converter. The structure of the chain-link converter permits build-up of a combined voltage across the chain-link converter, which is higher than the voltage available from each of its individual modules, via the insertion of the energy storage devices of multiple modules, each providing its own voltage, into the chain-link converter. In this manner switching of the or each module switching element in each module causes the chain-link converter to provide a stepped variable voltage source, which permits the generation of a voltage waveform across the chain-link converter using a step-wise approximation. As such the chain-link converter is capable of providing a wide range of complex voltage waveforms.

At least one switching element may be a wide-bandgap material based switching element or a silicon semiconductor based switching element. Examples of wide-bandgap materials include, but are not limited to, silicon carbide, boron nitride, gallium nitride and aluminium nitride.

At least one switching element may include at least one self-commutated switching device. The or each self-commutated switching device may be an insulated gate bipolar transistor (IGBT), a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. The number of switching devices in each switching element may vary depending on the required voltage and current ratings of that switching element.

At least one switching element may further include a passive current check element that is connected in anti-parallel with the or each switching device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy to selectively provide a voltage, e.g. a capacitor, fuel cell or battery.

It will be appreciated that the use of the terms "first" and "second", and the like, in this patent specification is merely intended to help distinguish between similar features (e.g. the first and second limb portions), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

A preferred embodiment of the invention will now be described, by way of a non-limiting example, with reference to the accompanying drawings in which:

FIGS. 1 and 2 show an electrical assembly according to an embodiment of the invention;

FIGS. 3 and 4 respectively show exemplary half-bridge and full-bridge chain-link module configurations of a module of the voltage source converter of FIG. 1;

The figures are not necessarily to scale, and certain features and certain views of the figures may be shown exaggerated in scale or in schematic form in the interests of clarity and conciseness.

The following embodiment of the invention is used primarily in HVDC applications, but it will be appreciated that the following embodiment of the invention is applicable mutatis mutandis to other applications operating at different voltage levels. The following embodiment of the invention is described with reference to an AC-DC voltage source converter that is preferably part of a bipole power transmission scheme.

Figure 1:
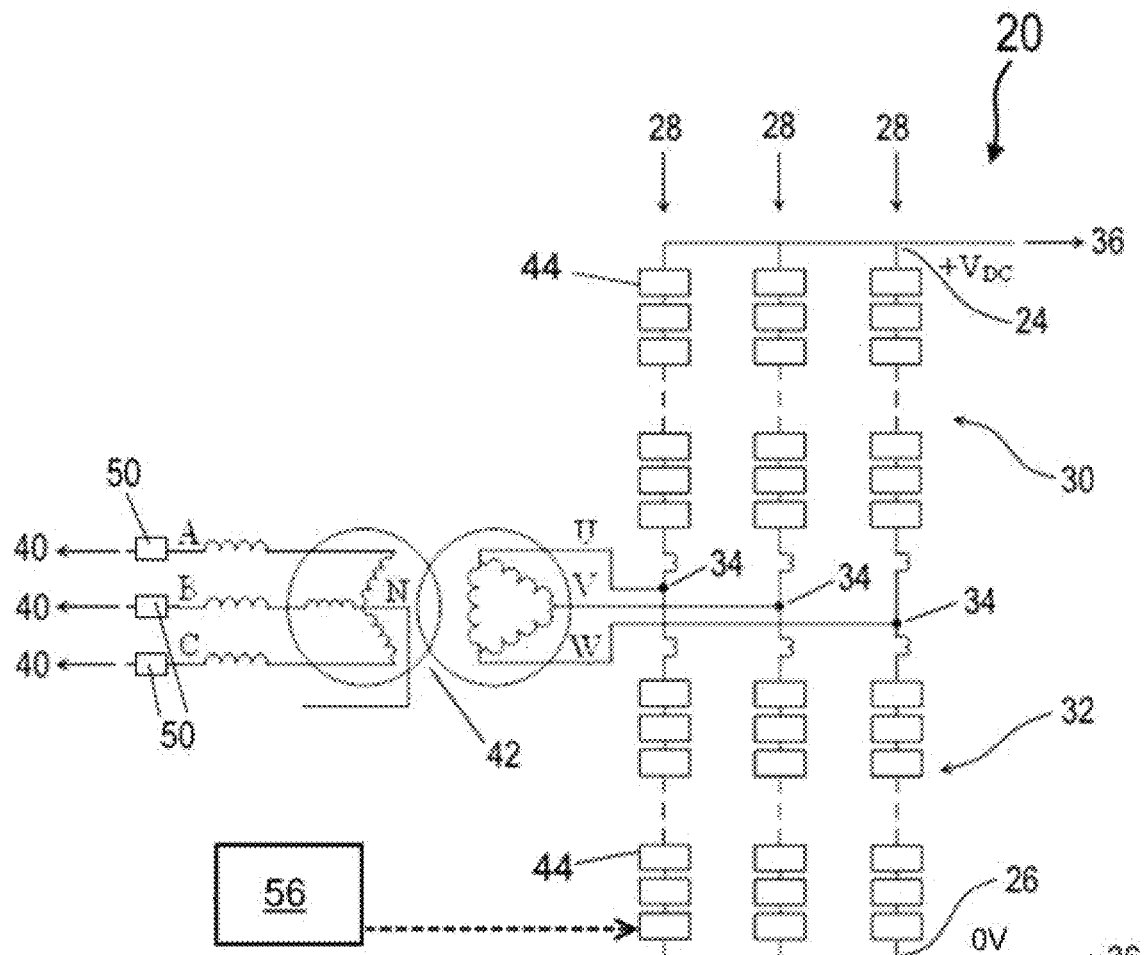
Figure 2:
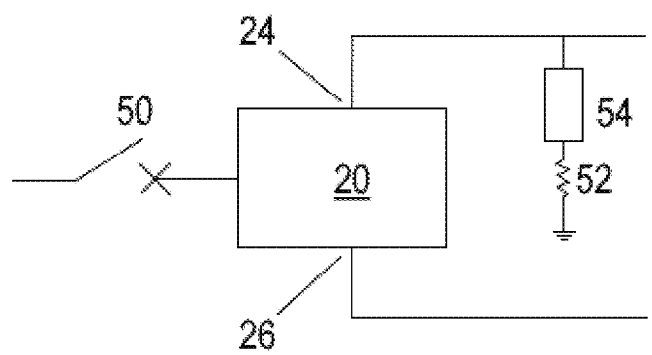

An electrical assembly according to an embodiment of the invention is shown in FIGS. 1 and 2.

The electrical assembly comprises a voltage source converter 20, a plurality of circuit interruption devices and a DC voltage modification device.

The voltage source converter 20 includes first and second DC terminals 24,26 and a plurality of converter limbs 28. Each converter limb 28 extends between the first and second DC terminals 24,26 and includes first and second limb portions 30,32 separated by a respective AC terminal 34. In each converter limb 28, the first limb portion 30 extends between the first DC terminal 24 and the AC terminal 34, while the second limb portion 32 extends between the second DC terminal 26 and the AC terminal 34.

In use, the first and second DC terminals 24,26 of the voltage source converter 20 are respectively connected to a DC network 36. In use, the AC terminal 34 of each converter limb 28 of the voltage source converter 20 connects each phase of the voltage source converter 20 to a respective AC phase of a three-phase AC network 40 via a star-delta transformer arrangement 42 and the circuit interruption devices. The three-phase AC network 40 is exemplarily an AC power grid 40. It is envisaged that, in other embodiments of the invention, the transformer arrangement may be a different type of transformer arrangement, such as a star-star transformer arrangement.

Each limb portion 30,32 includes a switching valve, which includes a chain-link converter that is defined by a plurality of series-connected modules 44.

Each module 44 may vary in topology, examples of which are described as follows.

Figure 3:
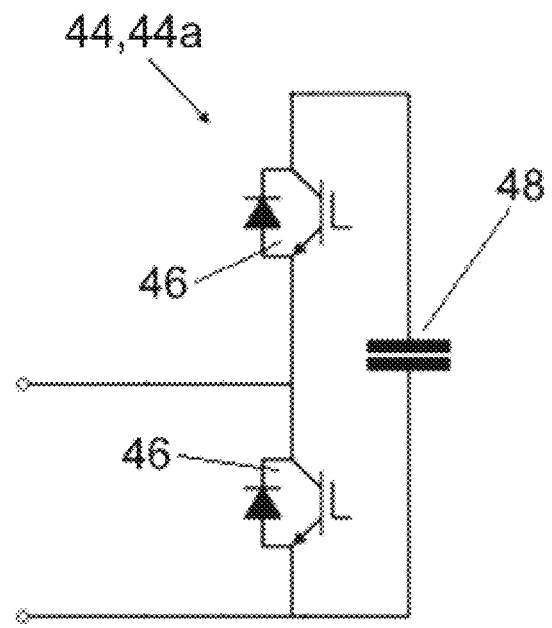

FIG. 3 shows schematically the structure of an exemplary module 44 in the form of a half-bridge module 44a. The half-bridge module 44a includes a pair of module switching elements 46 and a capacitor 48. Each module switching element 46 of the half-bridge module 44a is in the form of an IGBT which is connected in parallel with an anti-parallel diode. The pair of module switching elements 46 are connected in parallel with the capacitor 48 in a half-bridge arrangement to define a 2-quadrant unipolar module 44a that can provide zero or positive voltage and can conduct current in both directions.

Figure 4:
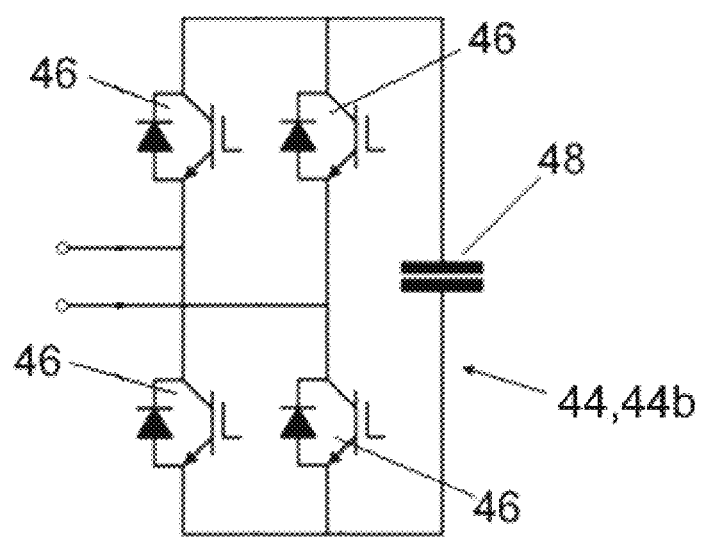

FIG. 4 shows schematically the structure of an exemplary module 44 in the form of a full-bridge module 44b. The full-bridge module 44b includes two pairs of module switching elements 46 and a capacitor 48. Each module switching element 46 of the full-bridge module 44b is in the form of an IGBT which is connected in parallel with an anti-parallel diode. The pairs of module switching elements 46 are connected in parallel with the capacitor 48 in a full-bridge arrangement to define a 4-quadrant bipolar module 44b that can provide negative, zero or positive voltage and can conduct current in both directions.

The structure of a given module 44 includes the arrangement and type of module switching elements 46 and energy storage device 48 used in the given module 44. It will be appreciated that it is not essential for all of the modules 44 to have the same module structure. For example, the plurality of modules 44 may comprise a combination of half-bridge modules 44a and full-bridge modules 44b.

It is envisaged that, in other embodiments of the invention, each module switching element 46 of each module 44 may be replaced by a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated semiconductor device. It is also envisaged that, in other embodiments of the invention, each diode may be replaced by a plurality of series-connected diodes.

The capacitor 48 of each module 44 is selectively bypassed or inserted into the corresponding chain-link converter by changing the states of the module switching elements 46. This selectively directs current through the capacitor 48 or causes current to bypass the capacitor 48, so that the module 44 provides a zero or non-zero voltage.

The capacitor 48 of the module 44 is bypassed when the module switching elements 46 in the module 44 are configured to form a short circuit in the module 44, whereby the short circuit bypasses the capacitor 48. This causes current in the corresponding chain-link converter to pass through the short circuit and bypass the capacitor 48, and so the module 44 provides a zero voltage, i.e. the module 44 is configured in a bypassed mode.

The capacitor 48 of the module 44 is inserted into the corresponding chain-link converter when the module switching elements 46 in the module 44 are configured to allow the current in the corresponding chain-link converter to flow into and out of the capacitor 48. The capacitor 48 then charges or discharges its stored energy so as to provide a non-zero voltage, i.e. the module 44 is configured in a non-bypassed mode.

In this manner the module switching elements 46 in each module 44 are switchable to control flow of current through the corresponding capacitor 48.

It is possible to build up a combined voltage across each chain-link converter, which is higher than the voltage available from each of its individual modules 44, via the insertion of the capacitors of multiple modules 44, each providing its own voltage, into each chain-link converter. In this manner switching of the module switching elements 46 in each module 44 causes each chain-link converter to provide a stepped variable voltage source, which permits the generation of a voltage waveform across each chain-link converter using a step-wise approximation. Hence, the module switching elements 46 in each limb portion 30,32 are switchable to selectively permit and inhibit flow of current through the corresponding capacitor 48 in order to control a voltage across the corresponding limb portion 30,32.

It is envisaged that, in other embodiments of the invention, each module 44 may be replaced by another type of module which includes at least one switching element and at least one energy storage device, the or each switching element and the or each energy storage device in each such module arranged to be combinable to selectively provide a voltage source.

It is also envisaged that, in other embodiments of the invention, the capacitor 48 in each module 44 may be replaced by another type of energy storage device which is capable of storing and releasing energy to provide a voltage, e.g. a battery or a fuel cell.

Each circuit interruption device is in the form of an AC circuit breaker 50. In use, each AC circuit breaker 50 may be closed to electrically interconnect the voltage source converter 20 and the AC network 40, and may be opened to electrically isolate the voltage source converter 20 from the AC network 40.

The DC voltage modification device includes a DC chopper and a dynamic braking resistor 52. The DC chopper includes a chopper switching element 54 that is preferably connected in series with the dynamic braking resistor 52. A first end of the DC voltage modification device is operably connected to the first DC terminal 24 so that the DC voltage modification device is connected outside the converter limbs 28. A second end of each DC voltage modification device is operably connected to ground. It is envisaged that, in other embodiments of the invention, the first end of the DC voltage modification device is operably connected to the second DC terminal 26, or the electrical assembly may include a plurality of DC voltage modification devices, each of which is connected to a respective one of the first and second DC terminals 24,26. Optionally the DC chopper may omit the dynamic braking resistor 52, particularly if the chopper switching element is configured to have sufficient current carrying capacity.

The electrical assembly further includes a controller 56 configured, e.g. programmed, to control the switching of the module switching elements 46, the AC circuit breakers 50 and the chopper switching element 54.

The electrical assembly may further include a plurality of sensors (not shown), each of which is configured to be in communication with the controller 56. Each sensor is configured to detect the presence of a converter internal fault 22 in the voltage source converter 20. This may be carried out by measuring an over current, an under voltage or a rate of change of current with time.

For the purposes of simplicity, the controller 56 is exemplarily described with reference to its implementation as a single control unit. In other embodiments, the controller 56 may be implemented as a plurality of control units. Each control unit of the controller 56 may be configured to control the module switching elements 46, the AC circuit breaker and the DC voltage modification device respectively. The configuration of the controller 56 may vary depending on specific requirements of the voltage source converter 20. For example, the controller 56 may include a plurality of control units, each of which is configured to control the switching of the module switching elements 46 of a respective one of the modules 44. Each control unit may be configured to be internal to, or external of, the corresponding module 44. Alternatively, the controller may include a combination of one or more control units internal to the corresponding module 44 and one or more control units external of the corresponding module 44. Each control unit may be configured to communicate with at least one other control unit via telecommunications links.

Operation of the voltage source converter 20 is described as follows with reference to FIGS. 5 to 8.

In order to transfer power between the DC and AC networks 36,40, the controller 56 controls the switching of the module switching elements 46 of the modules 44 to switch the capacitors 48 of the respective limb portions 30,32 into and out of circuit between the respective DC and AC terminals 24,26,34 to interconnect the DC and AC networks 36,40. The controller 56 switches the module switching elements 46 of the modules 44 of each limb portion 30,32 to provide a stepped variable voltage source between the respective DC and AC terminals 24,26,34 and thereby generate a voltage waveform so as to control the configuration of an AC voltage waveform at the corresponding AC terminal 34 to facilitate the transfer of power between the DC and AC networks 36,40.

The fault 22 may occur so as to result in a fault operating state of the voltage source converter 20 in which a fault current 58 flows in the voltage source converter 20. Such a fault may be in the form of a converter internal fault.

Figure 5:
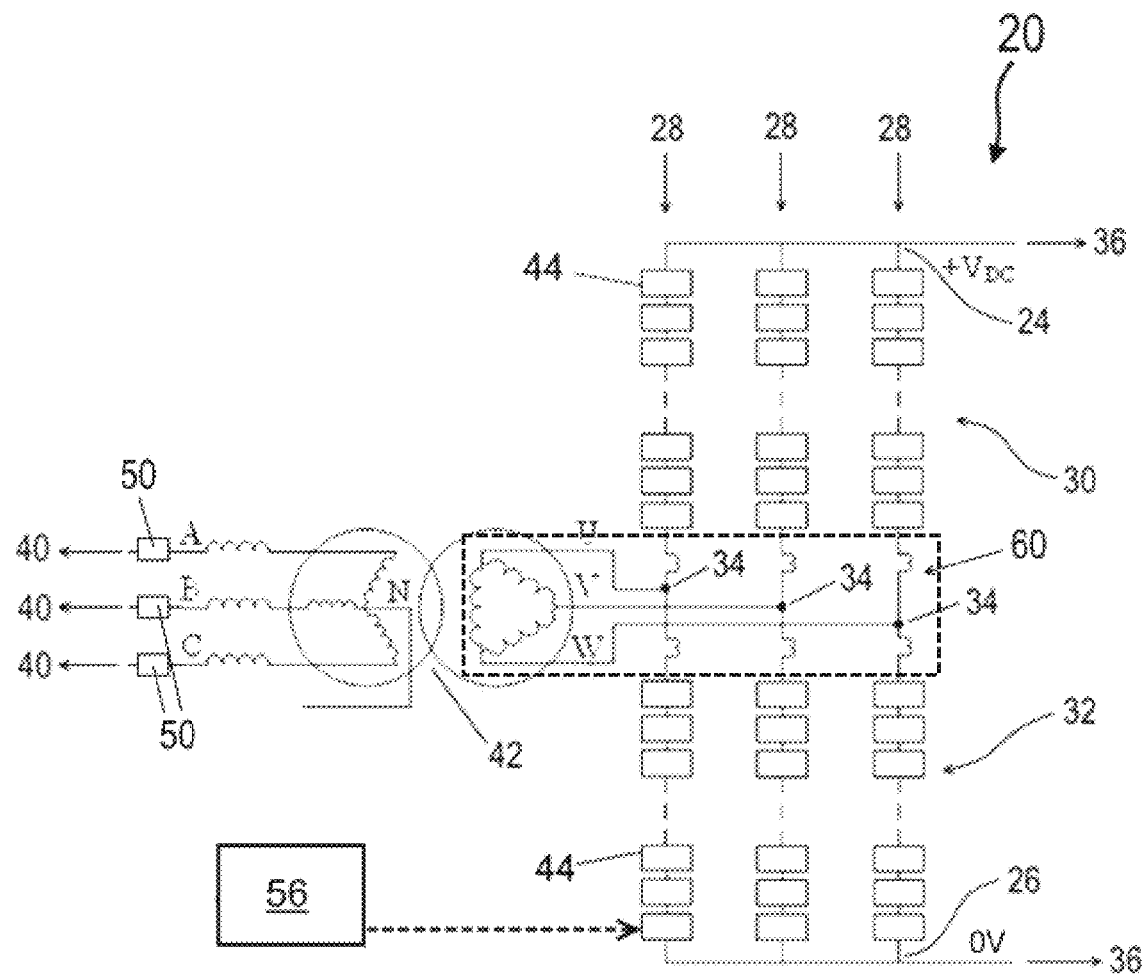
FIG. 5 shows an exemplary location of a converter internal fault of the voltage source converter of FIG. 1.

FIG. 5 shows an exemplary location 60 of the converter internal fault in the voltage source converter 20. The invention will be exemplarily described with reference to a converter internal fault 22 that takes the form of a phase to ground fault occurring in a phase associated with one of the converter limbs 28.

When the phase to ground fault 22 is detected by one of the sensors, the detection of the phase to ground fault 22 is communicated to the controller 56. In response to the detection of the phase to ground fault 22, the controller 54 switches the module switching elements 46 of the modules 44 of the converter limbs 28 so as to block the voltage source converter 20. At the same time, a command signal to open is sent to the AC circuit breakers 50 to electrically isolate the voltage source converter 20 from the AC network 40, and the chopper switching element 54 is closed to switch the DC voltage modification device into circuit between the first DC terminal 24 and ground.

Figure 6:
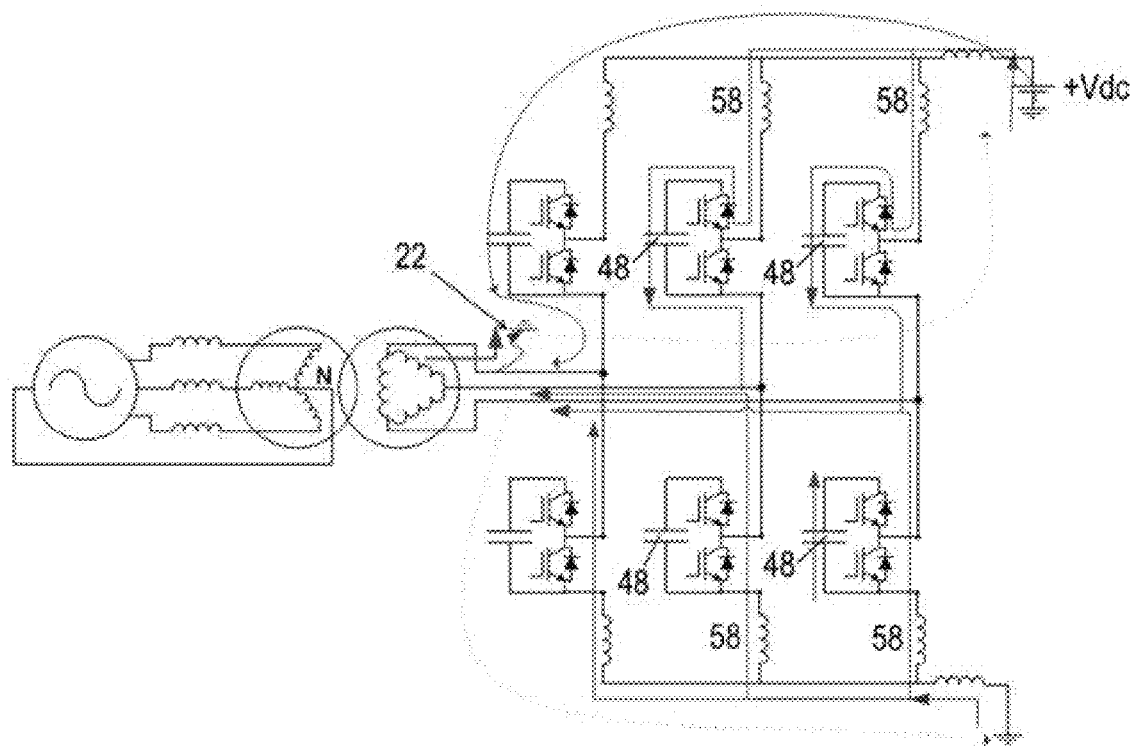
FIG. 6 shows the flow of a fault current during a converter internal fault of the voltage source converter of FIG. 1.

Blocking the voltage source converter causes a fundamental frequency fault current 58 to flow through the converter limbs 28, as shown in FIG. 6. The magnitude of the fault current 58 depends on the DC voltage at the DC side of the voltage source converter 20, the AC voltage of the secondary transformer winding connected to the AC side of the voltage source converter 20 and the DC voltage of the capacitors 48. Depending on which of the converter phases is associated with the phase to ground fault 22, the flow of the fault current 58 through the other healthy converter phases results in the charging of one or more capacitors 48 of the corresponding converter limbs 28. If left unchecked, such charging could result in the voltage source converter 20 experiencing a fault voltage which is higher than its normal operating voltage, i.e. an over voltage.

Figure 7:
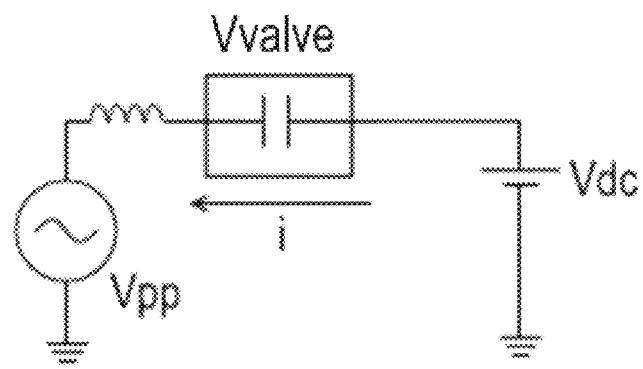
FIG. 7 shows an equivalent circuit representation of a converter phase during a converter internal fault of the voltage source converter of FIG. 1.

FIG. 7 shows an equivalent circuit representation of a healthy converter phase during the phase to ground fault 22. Hence, the fault current 58 can be calculated as follows:

$$i = \frac{Vdc + Vpp - (Vvalve)}{Z}$$

Where i is the fault current 58;
  Vdc is the DC voltage at the DC side of the voltage source converter 20;
  Vpp is the AC voltage of the transformer secondary winding at the AC side of the voltage source converter 20;
  Vvalve is the combined voltage of the capacitors 48 of a given healthy phase of the voltage source converter 20;
  Z is the equivalent impedance presented by the AC network 40, the transformer 42 and the limb portion reactor that oppose the rise of the fault current.

Switching the DC voltage modification device into circuit between the first DC terminal 24 and ground enables energy to be directed through and dissipated by the dynamic braking resistor 52, which has the effect of collapsing the DC voltage at the DC side of the voltage source converter 20. As a result the magnitude of the fault current 58 through the voltage source converter 20 is reduced, which has the effect of reducing the rate of charging of the corresponding capacitors 48 and thereby reduces the required amount of energy storage capacity to accommodate the charging operation arising from the flow of the fault current 58 in the voltage source converter 20. This advantageously permits a reduction in the number of switching modules 44 to reduce the size and footprint of the voltage source converter 20, which provides benefits in terms of cost savings, lower losses, and smaller cooling hardware requirements.

Figure 8:
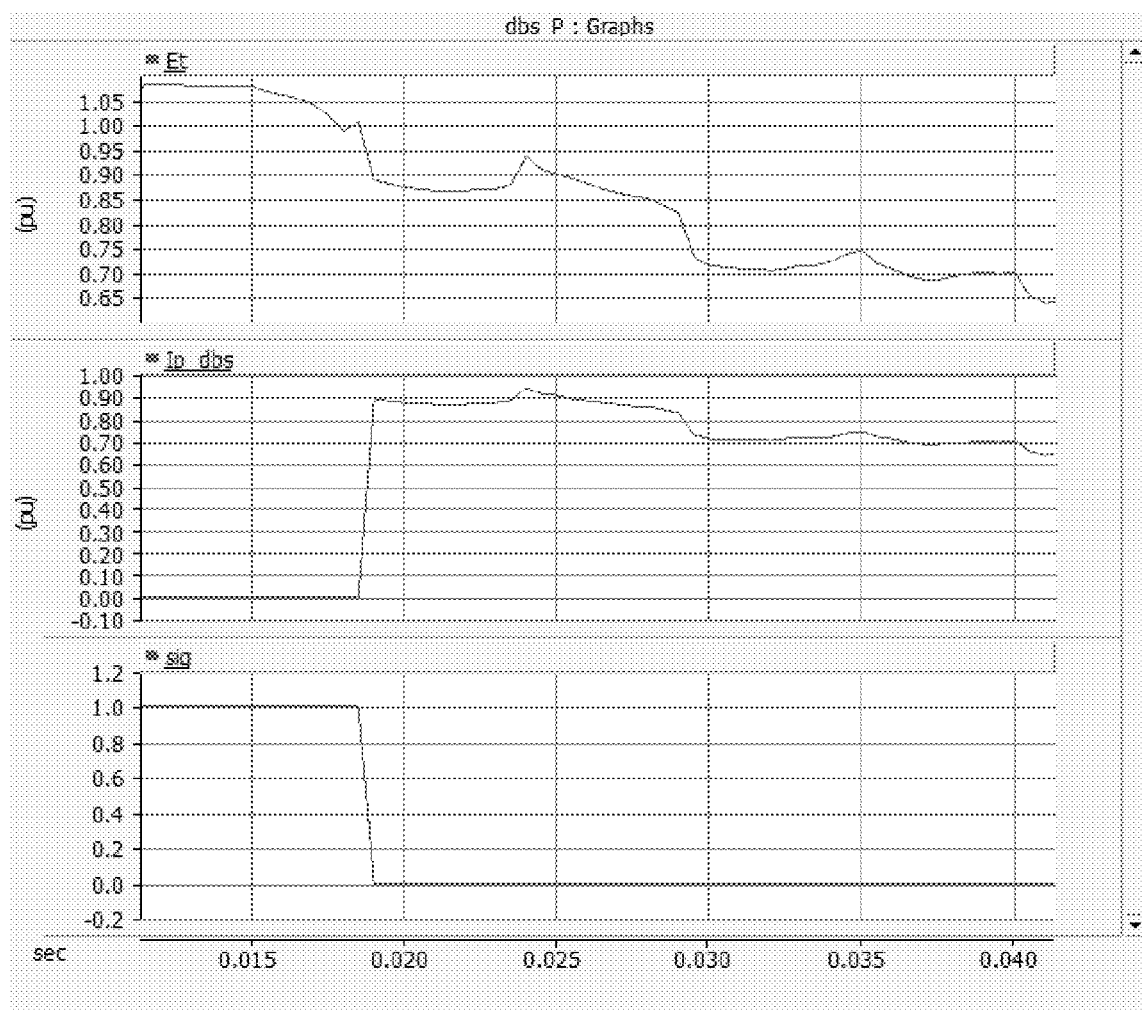
FIG. 8 shows the voltage and current behaviour of a DC voltage modification device of the electrical assembly of FIG. 1.

FIG. 8 shows the voltage and current behaviour of the DC voltage modification device of the electrical assembly of FIG. 1. The top graph of FIG. 8 shows the change in DC voltage at the DC side of the voltage source converter 20 before and after the DC voltage modification device is switched into circuit between the first DC terminal 24 and ground. The middle graph of FIG. 8 shows the change in current flowing through the DC voltage modification device before and after the DC voltage modification device is switched into circuit between the first DC terminal 24 and ground. The bottom graph of FIG. 8 shows the change in switching control signal for the chopper switching element of the DC voltage modification device, where the switching control signal set at '1' indicates that the chopper switching element 54 is in the same status as it was before the fault event and where the switching control signal set at '0' indicates that the chopper switching element 54 is controlled to switch the DC voltage modification device into circuit between the first DC terminal 24 and ground so that energy is directed through and dissipated by the dynamic braking resistor 52 in order to reduce the DC voltage.

It is apparent from FIG. 8 that the switching of the DC voltage modification device into circuit between the first DC terminal 24 and ground during the phase to ground fault 22 causes the collapse of the DC voltage at the DC side of the voltage source converter 20.

It will be appreciated that the invention is applicable to voltage source converters connected to other types of transformer arrangements, including a star-star transformer arrangement as mentioned above, and is also applicable to symmetrical, asymmetrical and bipole voltage source converters configured for use in symmetrical and asymmetrical monopole and bipole transmission schemes respectively.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An electrical assembly comprising:
a converter including a DC side and an AC side, the DC side configured for connection to a DC network, the AC side configured for connection to an AC network, the converter including at least one switching element;
a circuit interruption device operably connected to the AC side of the converter;
a DC voltage modification device operably connected to the DC side of the converter, the DC voltage modification device including a DC chopper; and
a controller configured to selectively control the or each switching element, the circuit interruption device and the DC voltage modification device,
wherein the controller is configured to be responsive to a converter internal fault by carrying out a fault operating mode in which the controller controls: the or each switching element to block the converter throughout the entirety of the fault operating mode; the circuit interruption device to electrically isolate the converter from the AC network; and the DC voltage modification device to reduce or minimize a DC voltage presented by the DC network to the DC side of the converter.

2. The electrical assembly according to claim 1 wherein the converter includes a plurality of phases, each phase includes at least one switching element, and the controller is configured to be responsive to the converter internal fault occurring in one of the phases by carrying out the fault operating mode.

3. The electrical assembly according to claim 1 wherein the converter internal fault is a phase to ground fault.

4. The electrical assembly according to claim 1 wherein the converter includes at least one module arranged to interconnect the DC and AC sides, the or each module including at least one module switching element and at least one energy storage device the or each module switching element and the or each energy storage device in the or each module arranged to be combinable to selectively provide a voltage source, the or each module switchable to control a transfer of power between the DC and AC networks.

5. The electrical assembly according to claim 1 wherein the converter includes a plurality of converter limbs, each converter limb extending between first and second DC terminals, each converter limb including first and second limb portions separated by an AC terminal, each limb portion including at least one switching element, and the controller is configured to be responsive to the converter internal fault occurring in or associated with one or some of the plurality of converter limbs by carrying out the fault operating mode.

6. The electrical assembly according to claim 1 including a sensor for detecting the converter internal fault, the sensor configured to be in communication with the controller.

7. The electrical assembly according to claim 1 wherein the DC voltage modification device includes a dynamic braking resistor.

8. A method of operating an electrical assembly, the electrical assembly comprising:
a converter that includes a DC side and an AC side, the DC side configured for connection to a DC network, the AC side configured for connection to an AC network, the converter including at least one switching element;
a circuit interruption device operably connected to the AC side of the converter; and
a DC voltage modification device operably connected to the DC side of the converter, the DC voltage modification device including a DC chopper,
wherein the method comprises carrying out a fault operating mode responsive to a converter internal fault by:
controlling the or each switching element to block the converter throughout the entirety of the fault operating mode;
controlling the circuit interruption device to electrically isolate the converter from the AC network; and
controlling the DC voltage modification device to reduce or minimize a DC voltage presented by the DC network to the DC side of the converter.

9. The method according to claim 8 wherein the converter includes a plurality of phases, and each phase includes at least one switching element, wherein the method includes carrying out the fault operating mode responsive to the converter internal fault occurring in one of the phases.

10. The method according to claim 9 wherein the converter internal fault is a phase to ground fault.

11. The method according to claim 8 wherein the converter includes at least one module arranged to interconnect the DC and AC sides, the or each module including at least one module switching element and at least one energy storage device, the or each module switching element and the or each energy storage device in the or each module arranged to be combinable to selectively provide a voltage source, the or each module switchable to control a transfer of power between the DC and AC networks.

12. The method according to claim 8 wherein the converter includes a plurality of converter limbs, each converter limb extending between first and second DC terminals, each converter limb including first and second limb portions separated by an AC terminal, each limb portion including at least one switching element, wherein the method includes carrying out the fault operating mode responsive to the converter internal fault occurring in or associated with one or some of the plurality of converter limbs.

13. The method according to claim 8 including detecting the converter internal fault.

14. The method according to claim 8 wherein the DC voltage modification device includes a dynamic braking resistor.

* * * * *